US011455247B1

(12) United States Patent
Burns et al.

(10) Patent No.: US 11,455,247 B1
(45) Date of Patent: Sep. 27, 2022

(54) SYSTEMS AND METHODS FOR PROVIDING APPLICATIONS SEAMLESS ACCESS TO LOCAL AND REMOTE MEMORY

(71) Applicant: TORmem Inc., San Jose, CA (US)

(72) Inventors: Scott Burns, Carson City, NV (US); Steven White, Morgantown, WV (US); Thao An Nguyen, San Jose, CA (US); Carl Perry, Round Rock, TX (US); Andrew Hodges, Peachtree Corners, GA (US)

(73) Assignee: TORmem Inc., San Jose, CA (US)

( * ) Notice: Subject to any disclaimer, the term of this patent is extended or adjusted under 35 U.S.C. 154(b) by 0 days.

(21) Appl. No.: 17/693,525

(22) Filed: Mar. 14, 2022

(51) Int. Cl.
*G06F 12/06* (2006.01)
*G06F 12/0802* (2016.01)

(52) U.S. Cl.
CPC .......... *G06F 12/06* (2013.01); *G06F 12/0802* (2013.01); *G06F 2212/251* (2013.01)

(58) Field of Classification Search
CPC ........................................ G06F 12/06

USPC ......................................................... 711/200
See application file for complete search history.

(56) References Cited

U.S. PATENT DOCUMENTS

2003/0191916 A1\* 10/2003 McBrearty .......... G06F 11/1464
711/112

\* cited by examiner

*Primary Examiner* — Jae U Yu
(74) *Attorney, Agent, or Firm* — Ansari Katiraei LLP; Arman Katiraei; Sadiq Ansari (57) ABSTRACT

Disclosed is a controller for providing applications seamless access to local and remote memory so that data of a particular application that is moved out of the Random Access Memory ("RAM") of a local device may be stored and accessed in RAM of a remote device rather than on higher latency and slower performing storage mediums. The controller provides an application with a first allocation of RAM from the local device running the application, and a second allocation of RAM from the remote device. The controller registers to receive a page fault notification for a particular page that the application attempts to access and that is not stored in the first allocation of RAM. The controller retrieves the particular page from the second allocation of RAM, and loads it into the first allocation of RAM where it becomes accessible by the application.

20 Claims, 6 Drawing Sheets

SYSTEMS AND METHODS FOR PROVIDING APPLICATIONS SEAMLESS ACCESS TO LOCAL AND REMOTE MEMORY

BACKGROUND

Servers and other computing devices have a limited amount of Random Access Memory ("RAM") or memory. The amount of memory may determine how much data is readily and quickly accessible to running applications of a computing device. Once the memory is filled, unused or unneeded applications and/or other data may be moved to a slower storage medium such as disk. Increasing the amount of memory typically requires adding Dual In-line Memory Modules ("DIMMs") or physical memory modules to the motherboard of the computing device so that the memory may be detected by the computing device operating system ("OS") and may be made locally accessible to the running applications.

DETAILED DESCRIPTION OF PREFERRED EMBODIMENTS

The following detailed description refers to the accompanying drawings. The same reference numbers in different drawings may identify the same or similar elements.

Provided are systems and methods for providing applications seamless access to local and remote memory so that data of a particular application that is moved out of the Random Access Memory ("RAM") or physical memory of a local device (e.g., the device running the particular application) may be stored and accessed in physical memory of a remote device rather than on higher latency and slower performing storage mediums (e.g., Solid State Disks ("SSDs"), magnetic disks, etc.) of the local device. Specifically, the systems and methods may include controlling the allocation of memory for the particular application so that the virtual address space used by the particular application includes physical memory of the local device and physical memory of the remote device. Moreover, the systems and methods may include performing memory transfers between the physical memories of the local device and the remote device in response to page fault notifications of the local device, wherein the page fault notifications may initiate the transfer of needed or requested data by the particular application from the physical memory of the remote device into the physical memory of the local device, and may initiate the transfer of unused data or data that is no longer needed by the particular application from the physical memory of the local device into the physical memory of the remote device.

The systems and methods may include a controller that seamlessly unifies access between the physical memory of a local device running one or more applications and the physical memory of a remote disaggregated memory device. In some embodiments, the controller may control the allocation of memory from the disaggregated memory device to the one or more applications, and may perform memory transfers that expand the virtual address space of the applications to include the allocated physical memory from the remote disaggregated memory device rather than slower storage mediums of the local device. Moreover, the controller may expand the virtual address space of the applications, and perform the dynamic mapping and transfer of data from addresses in the virtual address space to addresses in the physical memories of the local device and the remote disaggregated memory device without modifying the applications, the memory management system of the local device, or the operating system ("OS") of the local device.

In some embodiments, the controller may run with a set of memory allocation functions that override and/or take precedence over memory allocation functions of the memory management system or OS of the local device. The set of memory allocation functions used by controller may dynamically construct the virtual address space of a particular application with a smaller allocation of physical memory from the local device, and a larger allocation of physical memory from the remote disaggregated memory device.

In some embodiments, the controller may integrate with the paging system of the local device. The integration may include configuring the paging system to provide page fault notifications involving data of a particular application to the controller. Specifically, the page fault notifications may include commands from the OS for managing usage of the physical memory from the local device that is allocated for the particular application, and may identify pages of application data that are to be moved into the allocated physical memory of the local device, and pages of application data that are to be moved out of the allocated physical memory of the local device. The controller may include a handler that seamlessly shifts the particular application data between the allocated physical memory of the local device and the allocated physical memory of the remote disaggregated memory device based on the page fault notifications and a mapping of the application data from the virtual address space of the particular application to the memory addresses allocated from each of the local device and the remote disaggregated memory device.

Figure 1:
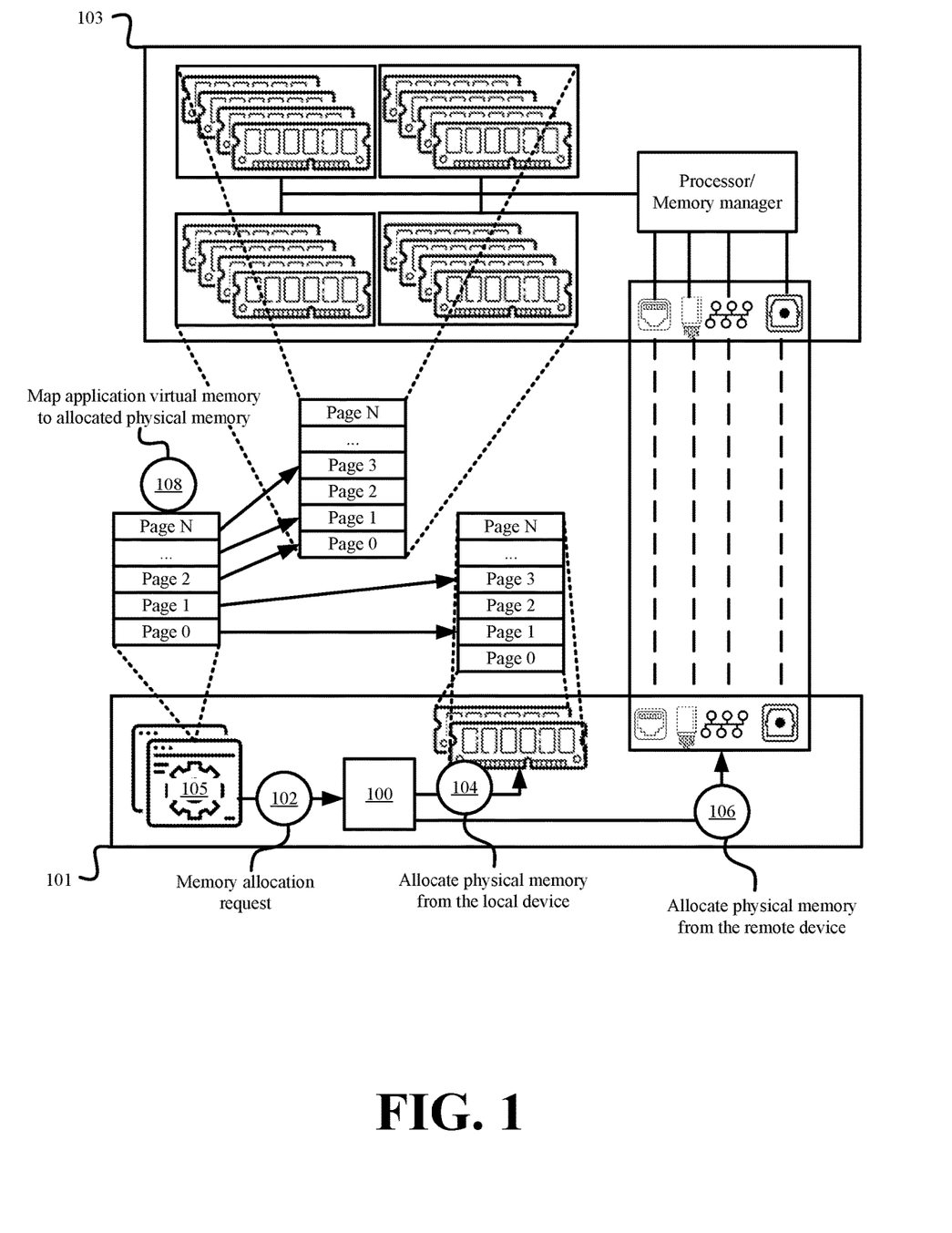
FIG. 1 illustrates an example of expanding the virtual memory of an application running on a local device with physical memory from a remote device in accordance with some embodiments presented herein.

FIG. 1 illustrates an example of controller 100 expanding the virtual memory of an application running on local device 101 with physical memory from remote device 103 in accordance with some embodiments presented herein. Local device 101 may be connected to remote device 103 via one or more interconnect fabrics.

Local device 101 may include a server, host, and/or another computing node with local or onboard processing, memory, storage, networking, and/or other resources. The memory of local device 101 may be provided by one or more Dual In-line Memory Modules ("DIMMs"), RAM modules, and/or other physical memory modules that are physically installed on a motherboard and/or connected to a bus of the local device. However, rather than install a large of amount of memory (e.g., one terabyte of memory) on local device 101, local device 101 may include a smaller amount of onboard physical memory (e.g., 16 gigabytes of memory) that may be dynamically scaled to a much larger amount (e.g., one terabyte of memory) by controller 100 using the physical memory of remote device 103.

Remote device 103 may be a disaggregated memory device that operates independent of and separate from local device 101. Specifically, an application may run directly on local device 101 using processing and other resources of local device 101 and may be controlled by the OS of local device 101. However, controller 100 may allow the application to access additional RAM or memory resources from remote device 103 via an interconnect fabric that connects local device 101 to remote device 103.

Remote device 103 may include a plurality of DIMMs, RAM modules, and/or other physical memory modules that collectively form a vast memory pool that may be orders of magnitude greater than the total available memory available on local device 101. For instance, remote device 103 may include tens of physical memory modules that collectively form a memory pool that is hundreds of gigabytes or several terabytes in size.

In some embodiments, the physical memory modules of remote device 103 may be uniform in terms of size and performance. For instance, remote device 103 may be configured with 16 Double Data Rate 5 Synchronous Dynamic Random-Access Memory ("DDR-5 SDRAM") modules with a clock rate of 6,000 megahertz and capacity of 32 gigabytes each. In some other embodiments, remote device 103 may be configured with banks of different memory modules. For instance, a first bank of remote device 103 may contain 8 DDR-4 SDRAM modules operating at a first speed or clock and with a first amount of capacity, and a second bank of remote device 103 may contain 8 DDR-5 SDRAM modules operating at a faster second speed or clock and with a larger second amount of capacity.

Remote device 103 may include a custom Application-Specific Integrated Circuit ("ASIC"), a custom-configured Field Programmable Gate Array ("FPGA"), or other processor that is adapted or configured to provide local device 101 and/or other computing devices with high-performance access to the memory pool of remote device 103. Controller 100 may communicate with the processor and/or memory management software of remote device 103, and may directly access the physical memory of remote device 103 using different lightweight, low latency, and high-speed interconnect fabrics and/or transport mechanisms. The interconnect fabric and/or transport mechanisms used to access the physical memory of remote device 103 may provide performance and latency that is commensurate with accessing local physical memory of local device 101 rather than performance and latency associated with accessing slower disk storage devices or remotely connected storage media.

In some embodiments, the interconnect fabrics may include Ethernet, InfiniBand, Fibre Channel, Peripheral Component Interconnect express ("PCIe"), and/or other communication or networking interfaces for connecting different components or computing devices. In some embodiments, the supported transport mechanisms may include Transmission Control Protocol ("TCP"), Remote Direct Memory Access ("RDMA"), and/or other protocols by which local device 101 may access the physical memory of remote device 103 without the intervention of a processor, OS kernel, and/or various layers of a network protocol stack on one or more of local device 101 and remote device 103.

Controller 100 may run on local device 101, and may provide one or more applications running on local device 101 with a virtual memory address space that spans and seamlessly accesses different allocations of physical memory from each of local device 101 and remote device 103. In particular, controller 100 may control the allocation of memory from local device 101 and remote device 103 to a particular application, and may control the swapping of pages containing data used by the particular application between the memories allocated from the two separate devices 101 and 103.

As shown in FIG. 1, controller 100 may intercept and/or receive (at 102) one or more memory allocation requests from application 105. Controller 100 may allocate (at 104) a first set of pages from the physical memory of local device 101, may allocate (at 106) a second set of pages from the physical memory of remote device 103, and may map (at 108) the virtual memory address space of application 105 to address within the allocated physical memory from devices 101 and 103. A page may represent an addressable block of the physical memory that may be 4 kilobytes in size or greater.

In some embodiments, controller 100 may be configured to allocate pages from the physical memory of local device 101 in response to smaller memory allocation requests (e.g., less than 128 kilobytes ("KB")) from application 105, and pages from the physical memory of remote device 103 in response to larger memory allocation requests (e.g., 128 KB or more). In some embodiments, controller 100 may be configured to allocate pages from the physical memory of local device 101 until the physical memory of local device 101 is filled and/or page faults occur, and may allocate pages from the physical memory of remote device 103 after the physical memory of local device 101 is filled and/or page faults occur. In some embodiments, controller 100 may be configured to allocate up to a particular amount of memory for application 105 from local device 101, and controller 100 may fulfill subsequent memory allocation requests from application 105 using memory of remote device 103. Some of the pages allocated from the physical memory of devices 101 and 103 may be free or unused, may store executable code of application 105, and/or may store data used by the executable code of application 105.

Controller 100 may manage the swapping of pages between the two memories so that data of application 105 and data accessed by application 105 remains entirely within physical memory, and is not temporarily stored in slower storage mediums of local device 101. For instance, FIG. 1 illustrates an example mapping of the virtual memory address space of application 105 to a first set of pages in the physical memory of local device 101 and to a second set of pages in the physical memory of remote device 103. Controller 100 may seamlessly integrate with local device 101 such that the memory allocation and page swapping for application 105 occurs without any changes to the operation of the memory management system, OS, or application 105 running on local device 101.

Figure 2:
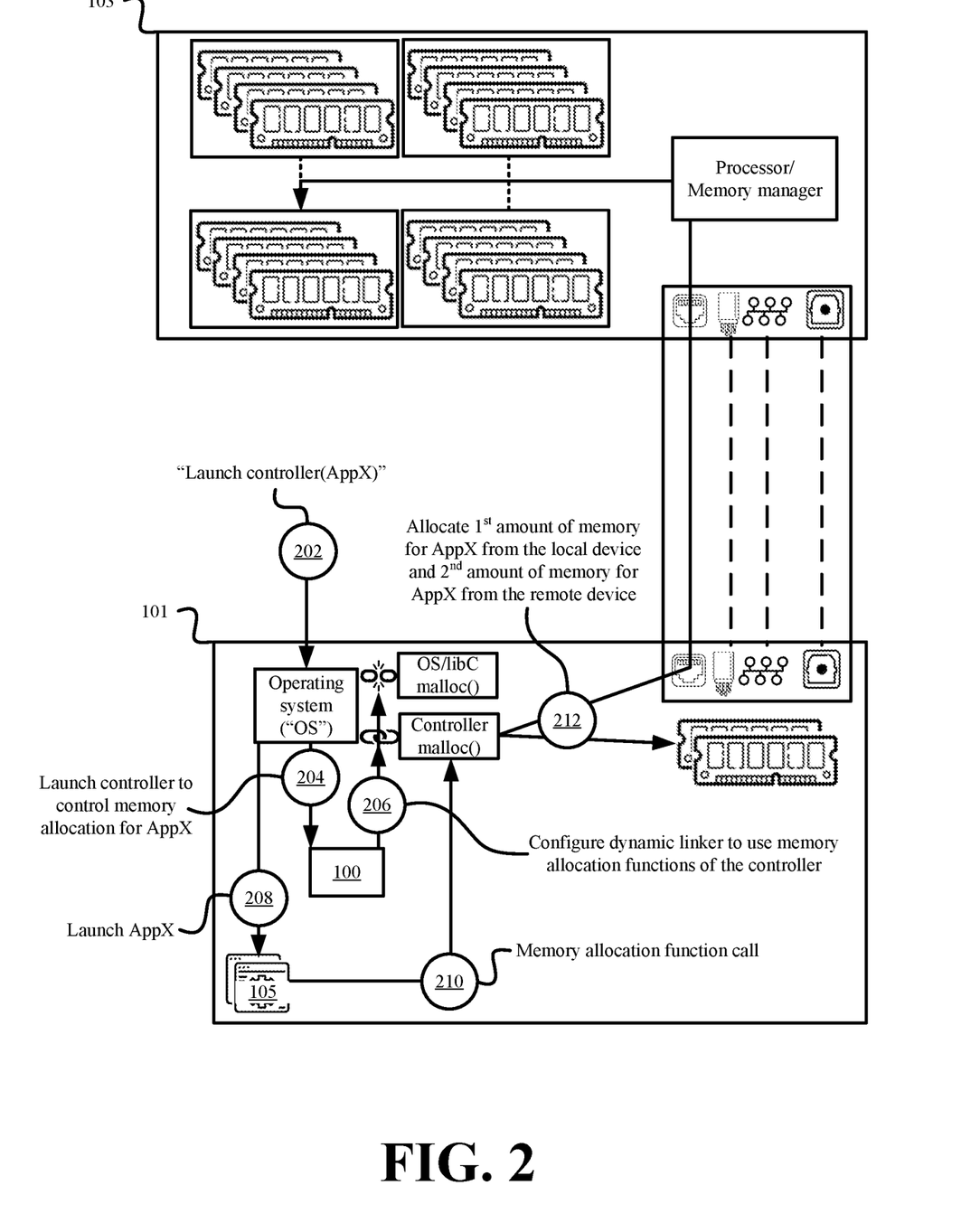
FIG. 2 illustrates an example of integrating a controller to assume memory allocation operations for a particular application in accordance with some embodiments presented herein.

FIG. 2 illustrates an example of integrating controller 100 to assume memory allocation operations for a particular application in accordance with some embodiments presented herein. Controller 100 may be launched (at 202) with application 105 via a command line interface, application programming interface ("API") call, system call, and/or other input issued to the OS of local device 101. For instance, the input may include an application invocation command that includes an executable name of controller 100 and an executable name and/or path for application 105.

The input may instruct the OS to begin execution (at 204) of controller 100 before application 105. Controller 100 may configure (at 206) the dynamic linker of the OS to load and use memory allocation functions of controller 100 instead of memory allocation functions in the C standard library (e.g., the glibc library) or memory allocation functions of the OS. More specifically, controller 100 may configure (at 206) the dynamic linker to route memory allocation requests from application 105 to a dynamic link library ("DLL") of controller 100 instead of a DLL of the OS, wherein the DLLs of controller 100 and the OS contain the same memory allocation functions or calls, but specify different operations for the functions or calls. Specifically, remote device 103 is not referenced in the memory allocation functions defined in the OS DLL, and is referenced in the memory allocation functions defined in the controller 100 DLL.

The memory allocation functions of controller 100 may control how much memory for application 105 is allocated from the physical memory of local device 101, and how much memory for application 105 is allocated from remote device 103. In some embodiments, controller 100 and/or the memory allocation functions of controller 100 may be configured with the addressing, identifiers, and/or other data for requesting memory from remote device 103 or issuing memory allocation calls directly to remote device 103 over one or more interconnect fabrics and transport mechanisms (e.g., RDMA) connecting local device 101 to remote device 103.

The OS may launch (at 208) application 105 after execution (at 204) of controller 100 and configuration (at 206) of the dynamic linker to the memory allocation functions of controller 100 for application 105. When the OS or application 105 calls (at 210) one or more memory allocation functions to allocate physical memory for use in running the executable code of application 105 and/or for storing data used by application 105 during execution, the dynamic linker causes the called functions within the memory allocation library of controller 100 to be executed instead of the corresponding functions within the C standard library or the memory allocation library of the OS. Depending on the size of the requested memory allocation, available memory in the physical memory of local device 101, previous memory allocations from the physical memory of local device 101, and/or other parameters associated with the memory allocation function call, the memory allocation functions of controller 100 may allocate (at 212) memory from local device 101 or remote device 103. For instance, the memory allocation function calls of controller may distribute requests to allocate memory for application 105 between local device 101 and remote device 103 such that a first amount of memory for application 105 is allocated (at 212) from the physical memory of local device 101, and a second amount of memory for application 105 is allocated from the physical memory of remote device 103. In some embodiments, controller 100 may map or maintain a mapping for the addresses of the pages allocated from the physical memory of each device 101 and 103 to the virtual memory address space of application 105.

In addition to controlling the allocation of memory for a particular application, controller 100 may intercept and handle page faults that occur when the particular application accesses data contained in pages that are not in the physical memory of local device 101, or when modified pages are ejected from the physical memory of local device 101 and written out to the physical memory of remote device 103. In other words, controller 100 may control the page swapping and/or memory transfers for the particular application so that the data of the particular application remains entirely within the physical memories of local device 101 and/or remote device 103, and is not read from or written to slower storage mediums of local device 101.

Figure 3:
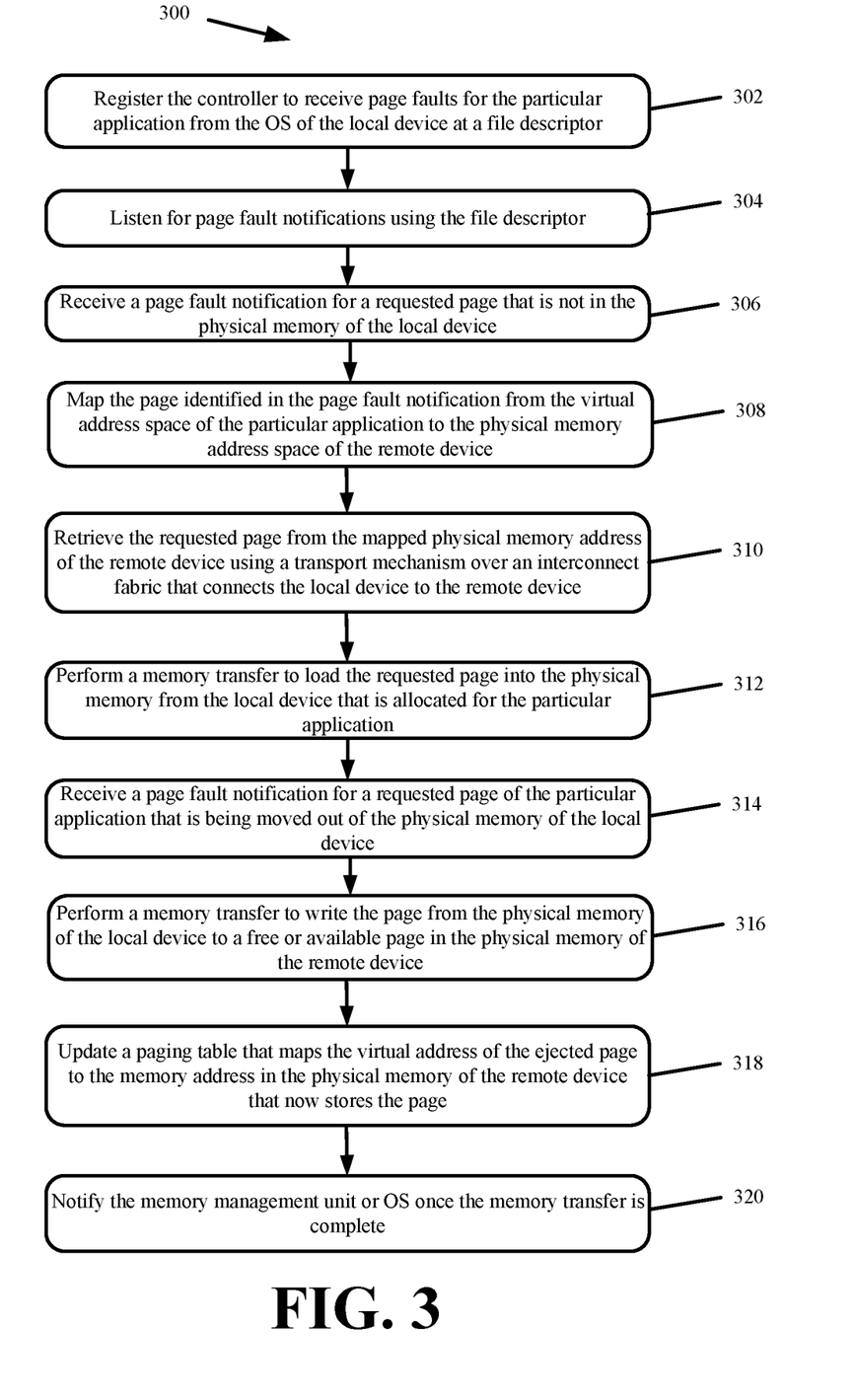
FIG. 3 presents a process for performing the page fault handling for a particular application to retain the particular application data within the physical memory of at least one of the local device or the remote device in accordance with some embodiments presented herein.

FIG. 3 presents a process 300 for performing the page fault handling for a particular application to retain the particular application data within the physical memory of at least one of local device 101 or remote device 103 in accordance with some embodiments presented herein. Process 300 may be implemented by controller 100.

Process 300 may include registering (at 302) controller 100 to receive page faults for the particular application from the OS of local device 101 that run the particular application. In some embodiments, registering (at 302) controller 100 may include delegating page faulting handing for the particular application from the OS to controller 100. For instance, controller 100 may use the userfaultfd API to create a file descriptor, and to cause the OS to send page fault notifications associated with the particular application to the file descriptor. In some embodiments, controller 100 may register (at 302) the entire virtual address range of the particular application so that the userfaultfd API generates page fault notifications to the file descriptor for any accessed pages in the virtual address range that are not present in the physical memory that is allocated from local device 101 to the particular application, or that are being ejected from the allocated physical memory of local device 101.

Process 300 may include listening (at 304) for page fault notifications using the file descriptor. In some embodiments, controller 100 may use the read function of the userfaultfd API to receive the page fault notifications. The read function from the userfaulfd API may be blocking or non-blocking.

Process 300 may include receiving (at 306) a page fault notification for a requested page that is not in the physical memory that is allocated from local device 101 to the particular application. Specifically, the particular application may request or attempt to access a page from its virtual memory address space that is not in the physical memory that is allocated from local device 101 to the particular application. The failed access may trigger a page fault. The userfaultfd API may receive the page fault, and may determine that a user space application (e.g., controller 100) is registered (at 302) to receive the page fault notifications with the file descriptor. Accordingly, the userfaultfd API may notify controller 100 of the read page fault notification by writing a page fault event to the file descriptor. In some embodiments, the page fault notification may identify the one or more pages containing the requested data.

Process 300 may include mapping (at 308) the page identified in the page fault notification from the virtual address space of the particular application to the physical memory address space of remote device 103. In some embodiments, controller 100 may perform the address translation based on a paging table that is maintained by one or more of controller 100, a memory management unit ("MMU") of local device 101, or the OS of local device 101.

Process 300 may include retrieving (at 310) the requested page from the mapped physical memory address of remote device 103 using RDMA or another transport mechanism over an interconnect fabric that connects local device 101 to remote device 103. Remote device 103 may read the requested page from the mapped physical memory address, and may return the requested page to controller 100.

Process 300 may include performing (at 312) a memory transfer to load the requested page retrieved from the physical memory of remote device 103 into the physical memory from local device 101 that is allocated for the particular application. In some embodiments, loading (at 312) the retrieved page may include responding to the page fault notification by notifying the kernel or OS that the page has been retrieved and is available for access from the physical memory of local device 101. Controller 100, the OS, or the MMU may update a paging table to identify the memory address within the physical memory of local device 101 where the page is stored. More specifically, the paging table may be modified so that the virtual address for the requested page points to a physical memory address of local device 101 where the requested page is now stored instead of a physical memory address of remote device 103 where the requested page was retrieved and transferred into the physical memory of local device 101. In some embodiments, performing (at 312) the memory transfer may also include instructing the particular application to resume operation if the operation was suspended or temporarily blocked until the requested page is made available in the physical memory of local device 101.

Process 300 may include receiving (at 314) a page fault notification for a page of the particular application that is being moved out of the physical memory of local device 101 in order to free memory for another page to be moved in. Controller 100 may receive (at 314) the page fault notification for the ejected page via the file descriptor that is created for the user space page fault handling of the particular application.

Process 300 may include performing (at 316) a memory transfer to write the page from the physical memory of local device 101 to a free or available page in the physical memory of remote device 103. Controller 100 may write the page using RDMA or another transport mechanism over an available interconnect fabric connecting local device 101 to remote device 103.

Process 300 may include updating (at 318) a paging table that maps the virtual address of the ejected page to the memory address in the physical memory of remote device 103 that now stores the page. Process 300 may include notifying (at 320) the MMU or OS once the memory transfer is complete.

The reading and writing to the physical memory of remote device 103 using RDMA or another transport mechanism over an available interconnect fabric may be orders of magnitude faster than reading and writing to a slower storage medium such as an SSD or magnetic disk. For instance, latency associated with a RDMA memory transfer may be less than 20 microseconds, whereas latency associated with a storage medium access may be hundreds of microseconds to milliseconds. Similarly, read and write performance of the physical memory of remote device 103 may be at least 5 to 10 times faster than the read and write performance of the fastest storage medium. Accordingly, performance of the particular application may be significantly improved by using controller 100 to expand the virtual memory address space of the particular application with the physical memory of remote device 103 rather than with solid state storage from a storage device of local device 101. Specifically, controller 100 may create the entire virtual memory address space of the particular application to map to the physical memories of local device 101 and remote device 103 so that pages and/or data for the particular application may be accessed with performance of the physical memories.

Nevertheless, accessing the physical memory of remote device 103 over an interconnect fabric may introduce some additional latency that is not present when accessing the physical memory of local device 101. Accordingly, in some embodiments, controller 100 may optimize performance of the remote memory access and/or memory transfers to and from remote device 103 to more closely match the physical memory performance of local device 101. In other words, controller 100 may obfuscate the latency associated with the remote memory access from the applications so that the difference between accessing the physical memory of local device 101 and remote device 103 becomes negligible or does not impact operation of the applications.

Figure 4:
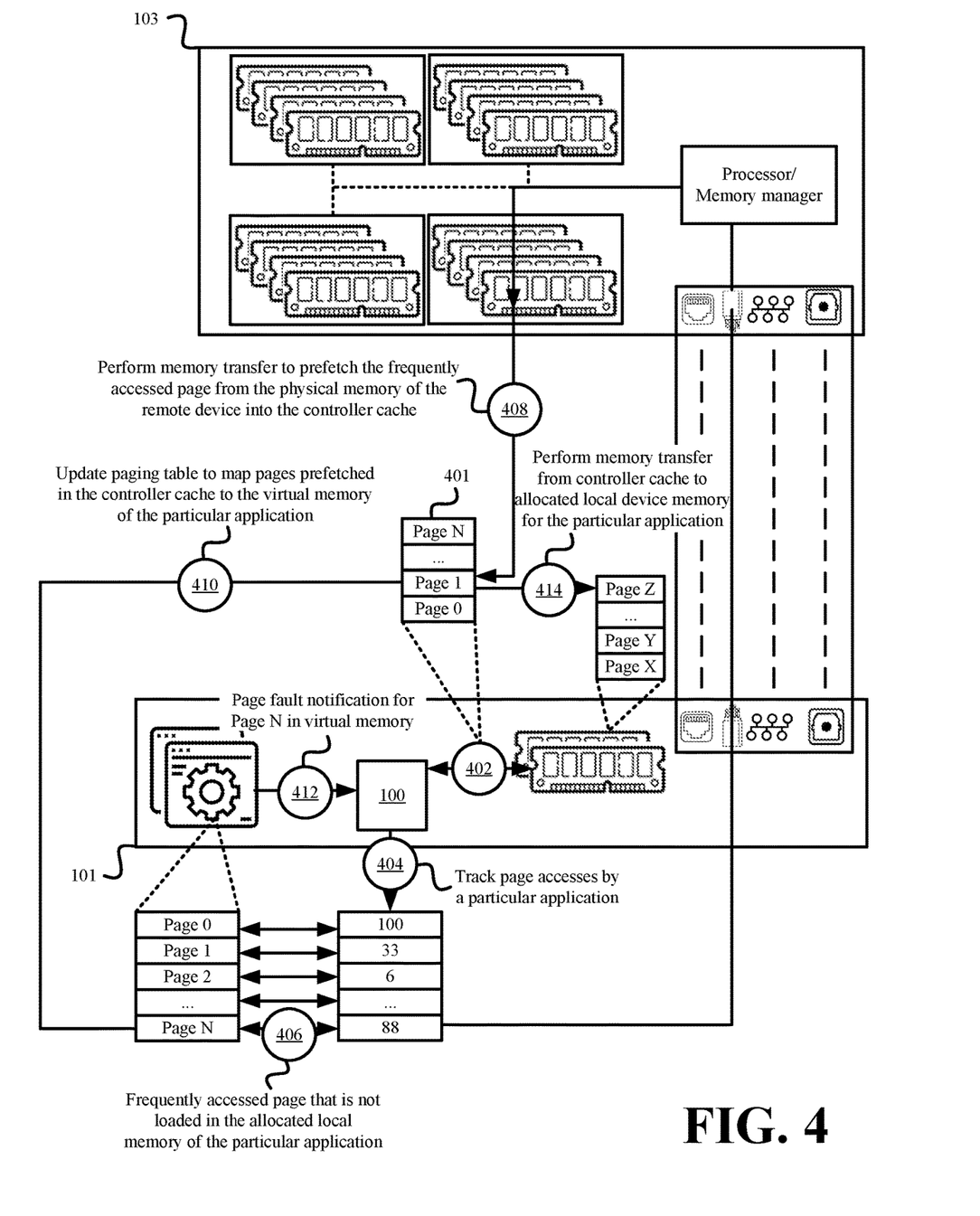
FIG. 4 illustrates read optimizations performed by the controller to minimize latency associated with page retrieval from the remote device over the interconnect fabric in accordance with some embodiments presented herein.

FIG. 4 illustrates read optimizations performed by controller 100 to minimize latency associated with page retrieval from remote device 103 over the interconnect fabric in accordance with some embodiments presented herein. As shown in FIG. 4, controller 100 may allocate (at 402) and use an amount of physical memory from local device 101 as buffer or cache 401.

Controller 100 may use cache 401 to retain frequently accessed pages or recently accessed pages of a particular application in the physical memory of local device 101 before those pages are accessed by the particular application. Once the particular application accesses a frequently accessed page, controller 100 may transfer the frequently accessed page from cache 401 or one memory address from the physical memory of local device 101 to another memory address from the physical memory of local device 101 that is part of the allocated local memory for the particular application instead of from the physical memory of remote device 103.

For instance, controller 100 may track (at 404) most frequently or most recently accessed pages of the particular application in metadata or in a table based on a number of times or a rate at which the particular application accesses those pages or by which those pages are moved into the physical memory allocated for the particular application by local device 101. In some embodiments, controller 100 may track accesses to different virtual addresses in the virtual memory address space of the particular application to determine which pages are most frequently or recently accessed. Controller 100 may track (at 404) the most frequently or most recently accessed pages across different running instances of the particular application, and may store the counts in a database or file on a non-volatile storage for use the next time the particular application is initialized.

Upon initialization of the particular application or while the particular application is running, controller 100 may determine (at 406) that a particular page is one of the frequently or recently accessed pages and that the particular page is not loaded in physical memory of local device 101 that is allocated for the particular application. Accordingly, controller 100 may perform (at 408) a memory transfer to prefetch the particular page from the physical memory of remote device 103 and to enter the particular page in cache 401 of controller. In this manner, controller 100 may use its own allocation of memory from local device 101 to cache the frequently or recently accessed pages of the particular application before those pages are loaded into the memory space allocated for the particular application.

In some embodiments, controller 100 may directly prefetch the particular page into the physical memory of local device 101 that is allocated for the particular application instead of cache 401. In some such embodiments, controller 100 may perform the prefetching without cache 401.

Controller 100 may update (at 410) a paging table to map pages from the virtual memory of the particular application to pages within cache 401, the physical memory allocated from local device 101 to the particular application, and the physical memory allocated from remote device 103 to the particular application. Accordingly, when the particular application attempts to access the particular page, a page fault notification may be generated. Controller 100 may receive (at 412) the page fault notification for the particular page from the userfaultfd API, may inspect the paging table to determine that the particular page is stored in cache 401, and may perform (at 414) a memory transfer to simply move the particular page from a first memory address in the physical memory of local device 101 that is allocated to cache 401 to a second memory address in the physical memory of local device 101 that is allocated to the particular application. Alternatively, if the particular page was prefetched directly into the physical memory of local device 101 that is allocated to the particular application, then no page fault occurs and the particular application may immediately access the data of the particular page.

In some embodiments, controller 100 may also prefetch one or more pages that are associated with the particular page identified in a page fault notification generated by the userfaultfd API into cache 401 or directly into the memory allocated from local device 101 for the particular application. For instance, controller 100 may receive a page fault notification for the particular page, and may determine a set of pages, that are not identified in the page fault notification, but that follow the particular page in the virtual address space of the particular application or the physical memory address of remote device 103 where the particular page is stored. Controller 100 may prefetch the set of pages from remote device 103 in response to the page fault notification for the particular page.

In some embodiments, controller 100 may load the set of pages in cache 401. Accordingly, if a later page fault notification is directed to one or more pages of the set of pages, those one or more pages will already be stored in the physical memory of local device 101 allocated as cache 401 for controller 100, and may be transferred or mapped to the physical memory of local device 101 that is allocated for the particular application. In some embodiments, controller 100 may load the set of pages in the allocated memory of the particular application so that no page fault occurs when the particular application attempts to access one or more of the set of pages.

In some embodiments, controller 100 may track a set of pages that are sequentially or commonly requested after a particular page. For instance, controller 100 may track the sequence of page fault notifications caused by a running application, and may determine the set of pages that are sequentially or commonly requested after the particular page. Controller 100 may then prefetch the set of pages from remote device 103 in response to a page fault notification involving the particular page. In some embodiments, controller 100 may use stride detection to predict the next set of pages that may be loaded into the allocated memory of the running application.

Figure 5:
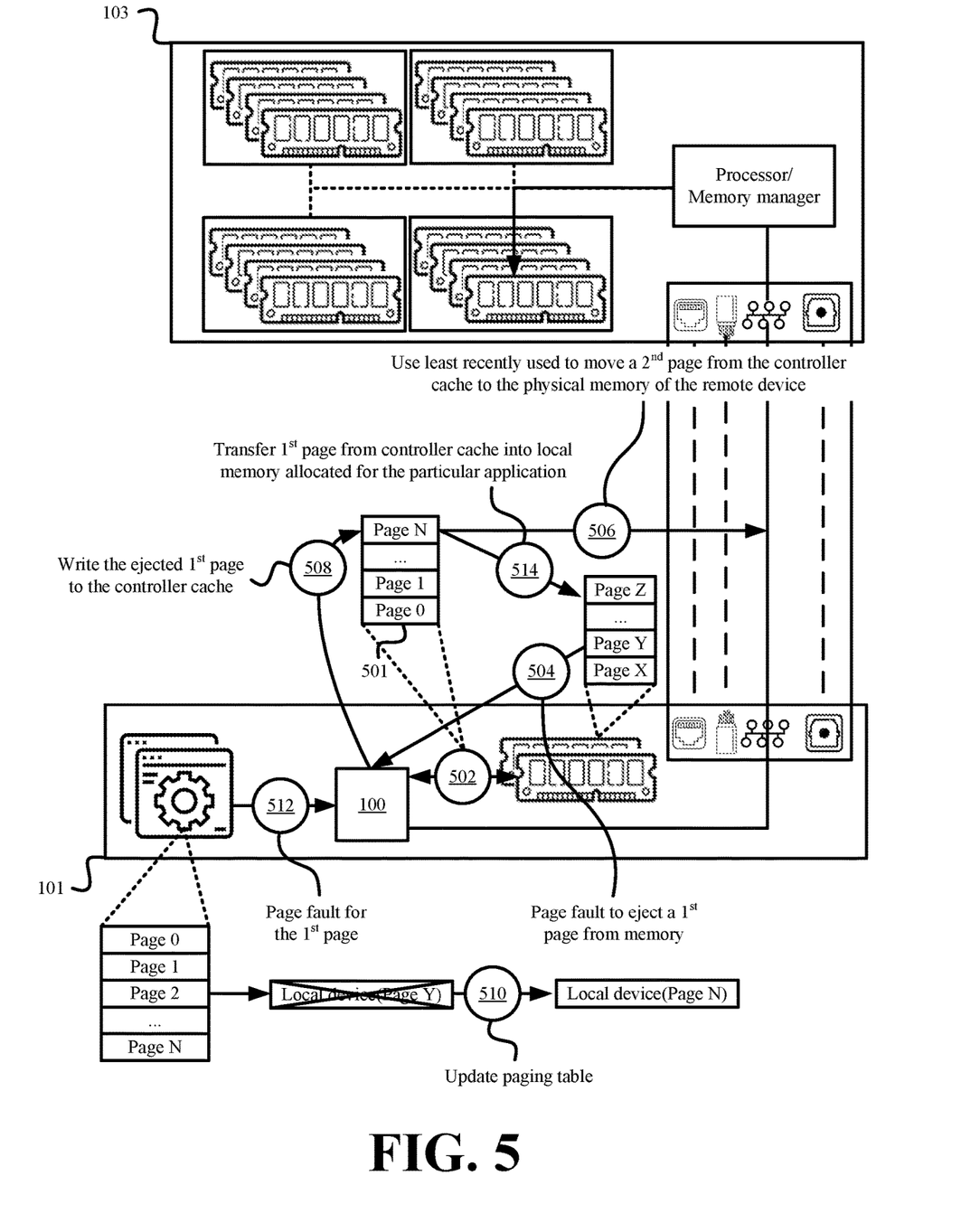
FIG. 5 illustrates write optimizations performed by the controller to minimize latency associated with writing pages that are moved out of the physical memory of the local device to the physical memory of the remote device over an interconnect fabric in accordance with some embodiments presented herein.

FIG. 5 illustrates write optimizations performed by controller 100 to minimize latency associated with writing pages that are moved out of the physical memory of local device 101 to the physical memory of remote device 103 over an interconnect fabric in accordance with some embodiments presented herein. Controller 100 may allocate (at 502) and use an amount of physical memory from local device 101 as buffer or cache 501.

Controller 100 may receive (at 504) a page fault notification of a particular page that is being moved out of the physical memory of local device 101 that is allocated for the particular application. The page fault notification may also identify another page that is being moved into the memory address previously occupied by the particular page.

Controller 100 may write the particular page into cache 501, and may immediately notify the OS that the particular page has been moved out of the particular application's allocated memory to allow the particular application to continue operations. If cache 501 is full, controller 100 may use (at 506) a least recently used ("LRU"), first-in first-out ("FIFO"), or other technique to determine which page to write out from cache 501 back to the physical memory of remote device 103 that is allocated for the particular application. Controller 100 may then write (at 508) the particular page into the memory address of cache 501 that was previously used to store the page moved to remote device 103. Controller 100 may update (at 510) a paging table to map the virtual memory address of the particular application that is associated with the particular page to the memory address of cache 501 where the particular page is now stored.

If the particular application requests the particular page before it is removed from cache 501, the request may generate (at 512) a page fault notification that is read by controller 100. Controller 100 may inspect the paging table to determine that the particular page resides in cache 501, and may transfer (at 514) the particular page from cache 501 back into the physical memory of local device 101 that is allocated for the particular application. The data contained by the particular page may be further modified by the particular application. In other words, controller 100 may buffer the ejected pages for some period of time so that they may be immediately transferred to the allocated memory of the particular application without having to retrieve the ejected pages from remote device 103.

Figure 6:
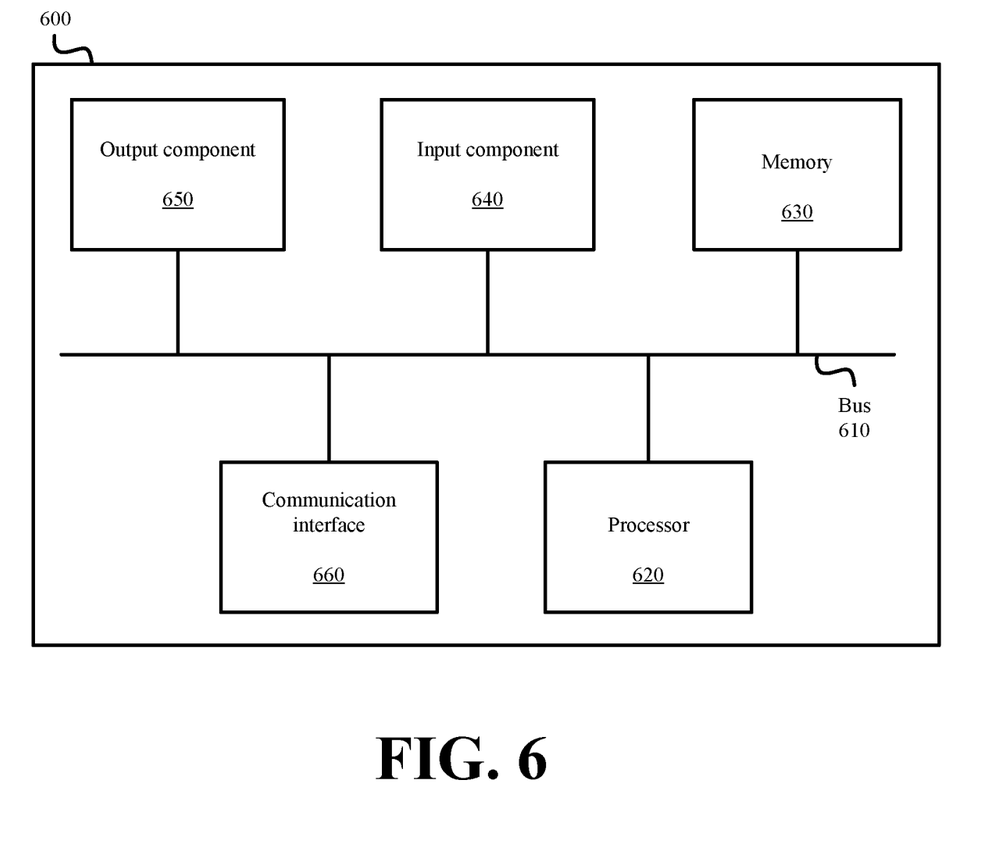
FIG. 6 illustrates example components of one or more devices, according to one or more embodiments described herein.

FIG. 6 is a diagram of example components of device 600. Device 600 may be used to implement one or more of the devices or systems described above (e.g., remote device 103, computing devices 102, controller 106, etc.). Device 600 may include bus 610, processor 620, memory 630, input component 640, output component 650, and communication interface 660. In another implementation, device 600 may include additional, fewer, different, or differently arranged components.

Bus 610 may include one or more communication paths that permit communication among the components of device 600. Processor 620 may include a processor, microprocessor, or processing logic that may interpret and execute instructions. Memory 630 may include any type of dynamic storage device that may store information and instructions for execution by processor 620, and/or any type of non-volatile storage device that may store information for use by processor 620.

Input component 640 may include a mechanism that permits an operator to input information to device 600, such as a keyboard, a keypad, a button, a switch, etc. Output component 650 may include a mechanism that outputs information to the operator, such as a display, a speaker, one or more LEDs, etc.

Communication interface 660 may include any transceiver-like mechanism that enables device 600 to communicate with other devices and/or systems. For example, communication interface 660 may include an Ethernet interface, an optical interface, a coaxial interface, or the like. Communication interface 660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 600 may include more than one communication interface 660. For instance, device 600 may include an optical interface and an Ethernet interface.

Device 600 may perform certain operations relating to one or more processes described above. Device 600 may perform these operations in response to processor 620 executing software instructions stored in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions stored in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    allocating a first amount of memory from a physical memory of a local device to a particular application that runs on the local device, and a second amount of memory from a physical memory of a remote device to the particular application, wherein the remote device is connected to the local device via one or more interconnect fabrics;
    registering a controller to receive page fault notifications from an operating system ("OS") of the local device;
    receiving, at the controller from the OS, a page fault notification for a particular page of data that the particular application attempts to access and that is not in the first amount of memory allocated for the particular application from the physical memory of the local device;
    retrieving, by the controller, the particular page of data from the second amount of memory of the remote device using the one or more interconnect fabrics; and
    loading, by the controller, the particular page of data into the first amount of memory of the local device.

2. The method of claim 1,
wherein the physical memory of the local device comprises a first set of Dual In-line Memory Modules ("DIMMs") or Random Access Memory ("RAM") modules that are installed on the local device; and
wherein the physical memory of the remote device comprises a larger second set of DIMMs or RAM modules that are installed on the remote device.

3. The method of claim 1 further comprising:
mapping references to a plurality of pages in a virtual memory of the particular application to a first set of pages associated with the first amount of memory that is allocated from the physical memory of the local device, and to a second set of pages associated with the second amount of memory that is allocated from the physical memory of the remote device.

4. The method of claim 3 further comprising:
modifying a particular reference to the particular page of data in the virtual memory, wherein modifying the particular reference comprises changing a mapping of the particular page of data from a first page in the second set of pages to a second page in the first set of pages in response to loading the particular page of data into the first amount of memory.

5. The method of claim 1, wherein registering the controller comprises:
requesting a file descriptor from which to access the page fault notifications generated by the particular application; and
reading the page fault notification using the file descriptor.

6. The method of claim 1 further comprising:
launching the controller before launching the particular application, wherein launching the controller comprises overriding a first set of memory allocation functions of the OS with a second set of memory allocation functions of the controller, and wherein the remote device is not referenced in the first set of memory allocation functions of the OS and is referenced in the second set of memory allocation functions of the controller.

7. The method of claim 1 further comprising:
configuring a dynamic linker of the OS to route memory allocation requests issued by the particular application from a first dynamic link library ("DLL") of the OS to a second DLL of the controller; and
executing the memory allocation requests issued by the particular application by calling one or more functions defined within the second DLL of the controller.

8. The method of claim 1, wherein allocating the first amount of memory and the second amount of memory comprises:
expanding a virtual memory of the particular application to include the first amount of memory that is allocated from the physical memory of the local device and the second amount of memory that is allocated from the physical memory of the remote device.

9. The method of claim 1 further comprising:
receiving, at the controller, a second page fault notification for a second page of data of the particular application that the OS ejects from the first amount of memory;
transferring the second page of data from a first address in the first amount of memory to a second address in the second amount of memory using a Remote Direct Memory Access ("RDMA") transport mechanism over the one or more interconnect fabrics; and
updating a paging table to change a physical memory address where the second page of data is accessible from the first address to the second address.

10. The method of claim 1 further comprising:
blocking execution of the particular application in response to receiving the page fault notification; and
resuming execution of the particular application in response to loading the particular page of data into the first amount of memory.

11. The method of claim 1, wherein allocating the first amount of memory and the second amount of memory comprises:
allocating memory from the physical memory of the local device in response to memory allocation requests for less than a specified amount of memory; and
allocating memory from the physical memory of the remote device in response to memory allocation requests for more than the specified amount of memory.

12. The method of claim 1, wherein allocating the first amount of memory and the second amount of memory comprises:
allocating the first amount of memory from the physical memory of the local device in response to a first set of memory allocation requests; and
allocating the second amount of memory from the physical memory of the remote device in response to a second set of memory allocation requests and the physical memory allocated from the local device exceeding the first amount of memory.

13. A local device comprising:
a physical memory formed from a plurality of Random Access Memory ("RAM") modules installed on the local device;
one or more interconnect fabrics connecting the local device to a remote device; and
one or more processors configured to:
allocate a first amount of memory from the physical memory of the local device to a particular application that runs on the local device, and a second amount of memory from a physical memory of the remote device to the particular application;
register a controller to receive page fault notifications from an operating system ("OS") of the local device;
receive, at the controller from the OS, a page fault notification for a particular page of data that the particular application attempts to access and that is not in the first amount of memory allocated for the particular application from the physical memory of the local device;
retrieve, by the controller, the particular page of data from the second amount of memory of the remote device using the one or more interconnect fabrics; and
load, by the controller, the particular page of data into the first amount of memory of the local device.

14. The local device of claim 13, wherein the one or more processors are further configured to:
map references to a plurality of pages in a virtual memory of the particular application to a first set of pages associated with the first amount of memory that is allocated from the physical memory of the local device, and to a second set of pages associated with the second amount of memory that is allocated from the physical memory of the remote device.

15. The local device of claim 14, wherein the one or more processors are further configured to:

modify a particular reference to the particular page of data in the virtual memory, wherein modifying the particular reference comprises changing a mapping of the particular page of data from a first page in the second set of pages to a second page in the first set of pages in response to loading the particular page of data into the first amount of memory.

16. The local device of claim 13, wherein registering the controller comprises:
requesting a file descriptor from which to access the page fault notifications generated by the particular application; and
reading the page fault notification using the file descriptor.

17. The local device of claim 13, wherein the one or more processors are further configured to:
launch the controller before launching the particular application, wherein launching the controller comprises overriding a first set of memory allocation functions of the OS with a second set of memory allocation functions of the controller, and wherein the remote device is not referenced in the first set of memory allocation functions of the OS and is referenced in the second set of memory allocation functions of the controller.

18. The local device of claim 13, wherein the one or more processors are further configured to:
configure a dynamic linker of the OS to route memory allocation requests issued by the particular application from a first dynamic link library ("DLL") of the OS to a second DLL of the controller; and
execute the memory allocation requests issued by the particular application by calling one or more functions defined within the second DLL of the controller.

19. The local device of claim 13, wherein allocating the first amount of memory and the second amount of memory comprises:
expanding a virtual memory of the particular application to include the first amount of memory that is allocated from the physical memory of the local device and the second amount of memory that is allocated from the physical memory of the remote device.

20. A non-transitory computer-readable medium, storing a plurality of processor-executable instructions to:
allocate a first amount of memory from a physical memory of a local device to a particular application that runs on the local device, and a second amount of memory from a physical memory of a remote device to the particular application, wherein the remote device is connected to the local device via one or more interconnect fabrics;
register a controller to receive page fault notifications from an operating system ("OS") of the local device;
receive, at the controller from the OS, a page fault notification for a particular page of data that the particular application attempts to access and that is not in the first amount of memory allocated for the particular application from the physical memory of the local device;
retrieve, by the controller, the particular page of data from the second amount of memory of the remote device using the one or more interconnect fabrics; and
load, by the controller, the particular page of data into the first amount of memory of the local device.

* * * * *